(12) United States Patent
Lyden et al.

(10) Patent No.: US 8,299,744 B2
(45) Date of Patent: Oct. 30, 2012

(54) CONTROL TECHNIQUES FOR MOTOR DRIVEN SYSTEMS

(75) Inventors: Colin Lyden, Baltimore (IE); Javier Calpe-Maravilla, Algemesi (ES); Mark Murphy, Kilmore (IE); Eoin English, Pallasgreen (IE)

(73) Assignee: Analog Devices, Inc., Norwood, MA (US)

( * ) Notice: Subject to any disclaimer, the term of this patent is extended or adjusted under 35 U.S.C. 154(b) by 803 days.

(21) Appl. No.: 12/367,883

(22) Filed: Feb. 9, 2009

(65) Prior Publication Data

US 2010/0201301 A1    Aug. 12, 2010

(51) Int. Cl.
G05B 11/01 (2006.01)
H02K 7/02 (2006.01)
G06F 3/033 (2006.01)
G06F 3/041 (2006.01)
G02B 13/16 (2006.01)
G11B 5/596 (2006.01)
G11B 5/09 (2006.01)
G11B 7/00 (2006.01)

(52) U.S. Cl. ........ 318/629; 318/161; 345/161; 345/173; 348/335; 360/77.02; 360/46; 369/44.15; 369/44.19

(58) Field of Classification Search .......... 318/161, 318/629; 345/161, 173; 348/335; 360/46, 360/77.02; 369/44.15, 44.19
See application file for complete search history.

(56) References Cited

U.S. PATENT DOCUMENTS

| | | | |
|---|---|---|---|
| 4,477,755 A * | 10/1984 | Rickert | 318/611 |
| 4,649,328 A | 3/1987 | Leonard et al. | |
| 4,761,774 A * | 8/1988 | Ishibashi et al. | 369/44.19 |
| 5,200,940 A * | 4/1993 | Goto et al. | 369/44.15 |
| 5,638,267 A | 6/1997 | Singhose et al. | |
| 5,736,824 A | 4/1998 | Sato et al. | |
| 5,786,678 A | 7/1998 | Kobayashi et al. | |
| 5,917,300 A | 6/1999 | Tanquary et al. | |
| 5,988,411 A | 11/1999 | Singer et al. | |
| 6,163,116 A | 12/2000 | Tanquary et al. | |
| 6,236,182 B1 | 5/2001 | Kerner | |
| 6,314,473 B1 | 11/2001 | Singer et al. | |

(Continued)

FOREIGN PATENT DOCUMENTS

FR    2922695    4/2009

(Continued)

OTHER PUBLICATIONS

Dennis R. Morgan and James Thi: A Multitone Pseudocascade Filtered-X LMS Adaptive Notch Filter; IEEE Transactions on Signal Processing, vol. 41, No. 2, Feb. 1993, pp. 946-956.*

(Continued)

Primary Examiner — Walter Benson
Assistant Examiner — Gabriel Agared
(74) Attorney, Agent, or Firm — Kenyon & Kenyon LLP

(57) ABSTRACT

Embodiments of the present invention provide a drive signal for a motor-driven mechanical system whose frequency distribution has zero (or near zero) energy at the expected resonant frequency of the mechanical system. The drive signal may be provided as a pair of steps sufficient to activate movement of the mechanical system and then park the mechanical system at a destination position. The steps are spaced in time so as to have substantially zero energy at an expected resonant frequency $f_R$ of the mechanical system. The drive signal may be filtered to broaden a zero-energy notch at the expected resonant frequency $f_R$.

14 Claims, 5 Drawing Sheets

U.S. PATENT DOCUMENTS

| | | | |
|---|---|---|---|
| 6,560,658 B2 | 5/2003 | Singer et al. | |
| 6,657,411 B1 | 12/2003 | Sasaki | |
| 6,829,207 B1 | 12/2004 | Singer | |
| 6,888,694 B2 * | 5/2005 | Guo et al. | 360/77.03 |
| 7,031,094 B2 * | 4/2006 | Chung | 360/75 |
| 7,068,923 B2 * | 6/2006 | Miyazaki | 388/806 |
| 7,084,958 B2 * | 8/2006 | Butler | 355/55 |
| 7,330,414 B2 | 2/2008 | Singer | |
| 7,433,144 B2 | 10/2008 | Singer | |
| 7,501,616 B2 * | 3/2009 | Wiklof | 250/234 |
| 7,639,232 B2 | 12/2009 | Grant et al. | |
| 2003/0133218 A1 * | 7/2003 | Guo et al. | 360/75 |
| 2004/0090878 A1 * | 5/2004 | Soma et al. | 369/30.16 |
| 2005/0134562 A1 * | 6/2005 | Grant et al. | 345/161 |
| 2007/0019321 A1 | 1/2007 | Kim et al. | |
| 2008/0062143 A1 * | 3/2008 | Shahoian et al. | 345/173 |
| 2008/0106307 A1 | 5/2008 | Lee et al. | |
| 2008/0158406 A1 * | 7/2008 | Ito | 348/335 |
| 2008/0170322 A1 * | 7/2008 | Konishi | 360/77.02 |
| 2009/0102403 A1 | 4/2009 | Lule | |

FOREIGN PATENT DOCUMENTS

| | | |
|---|---|---|
| WO | 2009/116453 | 9/2009 |

OTHER PUBLICATIONS

PCT International Search Report for PCT/US2010/022083 mailed on Aug. 3, 2011.
International Preliminary Report on Patentability for PCT/US2010/022083 mailed on Aug. 18, 2011.
AD5398: 120 mA, Current Sinking, 10-Bit, I2C® DAC. 2005 Analog Devices, Inc. www.analog.com.
AD5821: 120 mA, Current Sinking, 10-Bit, I2C® DAC. 2007 Analog Devices, Inc. www.analog.com.
AD5820: 100 mA, Current Sinking, 10-Bit, I2C® DAC. 2008 Analog Devices, Inc. www.analog.com.
AD5830: VCM Driver with Shutter Assembly. 2008 Analog Devices, Inc. www.analog.com.
PCT International Search Report for PCT/US2010/022117 mailed on Dec. 8, 2011.
Partial International Search Results mailed May 2, 2012, for PCT International Application No. PCT/US2010/022110.

* cited by examiner

RESPONSE OF
MECHANICAL SYSTEM

CONTROL TECHNIQUES FOR MOTOR DRIVEN SYSTEMS

RELATED APPLICATION

This application is related to co-pending application "Control techniques for motor driven systems", reference number 13641-387302, also filed on Feb. 9, 2009.

BACKGROUND

The present invention relates to motor control and control of motor driven systems. In particular, it relates to control of motor driven systems that minimize ringing or 'bounce' in the mechanical systems that are under motor control.

Motor driven translational systems are commonplace in modern electrical devices. They are used when it is necessary to move a mechanical system within a predetermined range of motion under electrical control. Common examples can include autofocus systems for digital cameras, video recorders and portable devices having such functionality (e.g., mobile phones, personal digital assistants and hand-held gaming systems). In such systems, a motor driver integrated circuit generates a multi-value drive signal to a motor which, in turn, drives a mechanical system (e.g. a lens assembly, in the case of an auto-focus system). The motor driver generates the drive signal in response to an externally supplied codeword. The code word often is a digital value that identifies a location within the mechanical system's range of motion to which the motor should move the mechanical system. Thus, the range of motion is divided into a predetermined number of addressable locations (called "points" herein) according to the number of code words allocated to the range of motion. The drive signal is an electrical signal that is applied directly to the motor to cause the mechanical system to move as required.

Although the types and configurations of the mechanical systems typically vary, many mechanical systems can be modeled as a mass coupled to a spring. When a motor moves the mass according to the drive signal, the motion generates other forces within the system which can cause the mass to oscillate around the new location at some resonant frequency ($f_R$). For example, resonant frequencies of approximately 110 Hz have been observed in consumer electronic products. Such oscillation typically diminishes over time but it can impair performance of the device in its intended function by, for example, extending the amount of time that a camera lens system takes to focus an image.

FIG. 1 is a simplified block diagram of a motor-driven system commonly used in lens drivers. The system includes an imaging chip 110, a motor driver 120, a voice coil motor 130 and a lens 140. The motor driver generates a drive signal to the voice coil motor in response to a code provided by the imaging chip. In turn, the voice coil motor moves the lens within its range of motion. Movement of the lens changes the way the lens focuses incoming light on a surface of the imaging chip, which can be detected and used to generate new codes to the motor driver. FIG. 2 is a frequency plot of possible response of the system of FIG. 1, illustrating a resonant frequency at frequency $f_R$.

FIG. 3 illustrates two drive signals generated by conventional motor drivers. A first drive signal is a step function, that changes from a first state to a second state as a discontinuous jump (FIG. 3(a)). The second illustrated drive signal is a ramp function that changes from the first state to the second state at a fixed rate of change (FIG. 3(b)). Both types of drive signals, however, cause the ringing behavior that impairs performance as noted above. FIG. 4, for example, illustrates ringing observed in one such mechanical system.

The inventors have observed that the ringing behavior of such motor-driven systems unnecessarily extends the settling times of such mechanical systems and degrades performance. Accordingly, there is a need in the art for such motor-driven systems that can be driven according to a digital codeword and avoids the oscillatory behavior noted in these systems.

DETAILED DESCRIPTION

Embodiments of the present invention provide a drive signal for a motor-driven mechanical system whose frequency distribution has zero (or near zero) energy at the expected resonant frequency of the mechanical system. The drive signal may be provided as a pair of steps sufficient to activate movement of the mechanical system and then park the mechanical system at a destination position. The steps are spaced in time so as to have substantially zero energy at an expected resonant frequency $f_R$ of the mechanical system. The drive signal may be filtered to broaden a zero-energy notch at the expected resonant frequency $f_R$.

Figure 5:
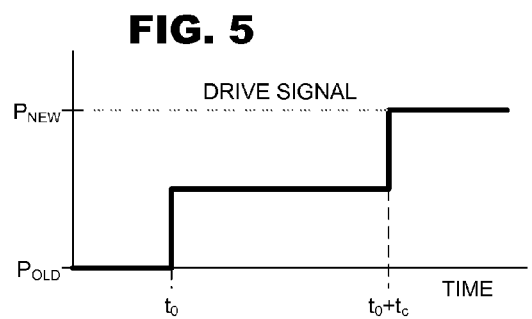
FIG. 5 illustrates a drive signal according to an embodiment of the present invention.

FIG. 5 is a graph illustrating an exemplary drive signal according to an embodiment of the present invention. The drive signal is a multi-stage step function that changes at times corresponding to a time constant:

$$t_c \cong \frac{1}{2f_R}. \qquad \text{Eq. 1}$$

Figure 6:
FIG. 6 is a graph illustrating height and position of steps of the drive signal of FIG. 5.

This translates to a drive signal with two steps, a first step at time $t_0$, having an amplitude corresponding to one half the level needed to traverse a distance separating a old position ($P_{OLD}$) from a new position ($P_{NEW}$) ($\Delta P = P_{NEW} - P_{OLD}$). A second step may occur at time $t_0 + t_c$, also having an amplitude corresponding to $\frac{1}{2}\Delta P$. FIG. 6 illustrates differential response of the drive signal of FIG. 5.

Figure 7:
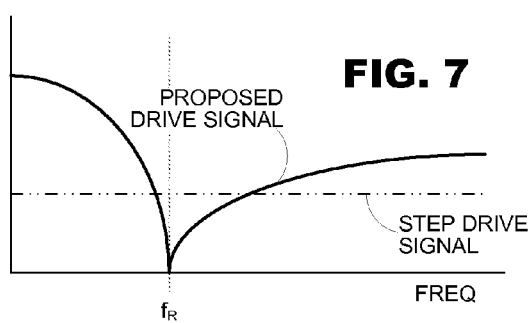
FIG. 7 is a graph illustrating energy distribution by frequency of a drive signal of the present invention.

FIG. 7 is a graph illustrating energy distribution of the drive signal of FIG. 5 by frequency. As shown, the drive signal has non-zero energy distribution at frequencies both above and below the resonant frequency $f_R$. At the resonant frequency fR, the drive signal has zero energy. This energy distribution minimizes energy imparted to the mechanical system and, therefore, avoids oscillation that may occur in such systems.

FIG. 7 also illustrates energy distribution that may occur in a drive signal generated from a unitary step function (phantom). In this graph, the system has non-zero energy at the resonant frequency $f_R$, which causes energy to be imparted to the mechanical system at this frequency. This non-zero energy component at the resonant frequency $f_R$ is believed to contribute to the prolonged oscillation effect observed by the inventors.

Figure 8:
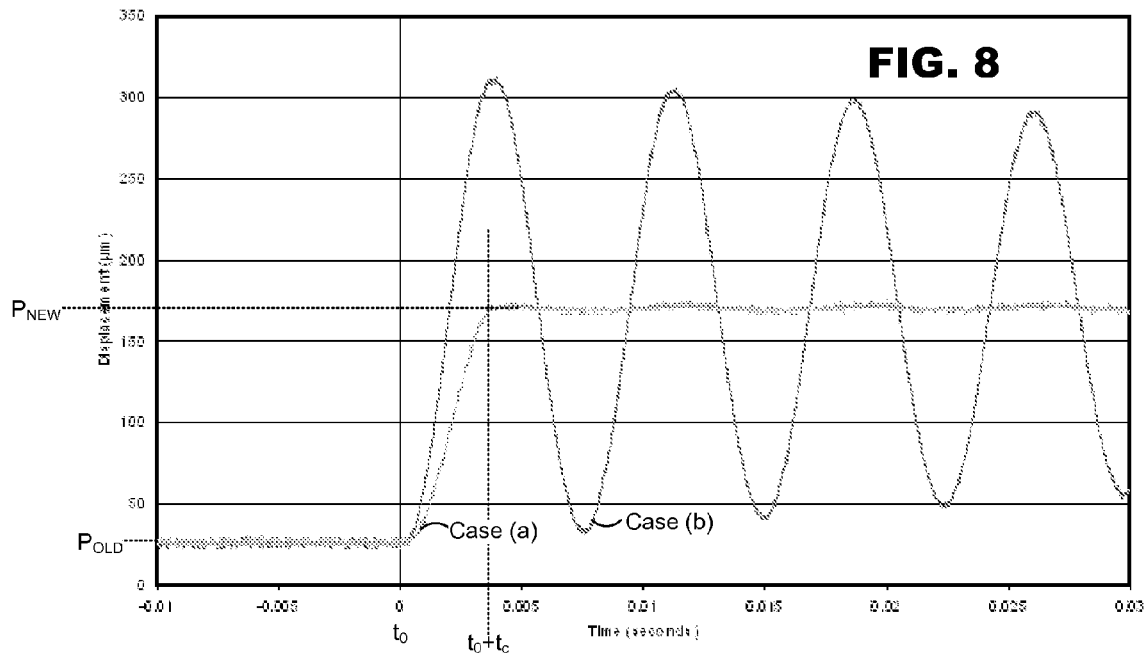
FIG. 8 illustrates response of a mechanical system observed under a drive signal such as shown in FIG. 5.

FIG. 8 is a graph that illustrates response of a mechanical system when driven by a drive signal having a shape as shown in FIG. 5 (case (a)). The mechanical system starts at a position $P_{OLD}$ and moves to a position $P_{NEW}$. Activation pulses are applied at times $t_0$ and $t_0+t_C$. In this example, $P_{OLD}$ corresponds to 27 μm (digital code 50) and $P_{NEW}$ correspond to 170 μm (digital code 295), $t_0$ corresponds to t=0 and $t_C$ corresponds to 3.7 ms.

FIG. 8 compares the mechanical system's response under the drive signal proposed herein (case (a)) against the response observed when driven by a drive signal according to a unitary step function (case (b)). Whereas in case (a) the mechanical system has settled on the new position $P_{NEW}$ after about 4 ms, the same mechanical system exhibits prolonged oscillation in case (b). Even after 30 ms, the mechanical system continues to oscillate about the $P_{NEW}$ position. Accordingly, the drive signal of FIG. 5 provides substantially faster settling times than conventional drive signals.

Figure 9:
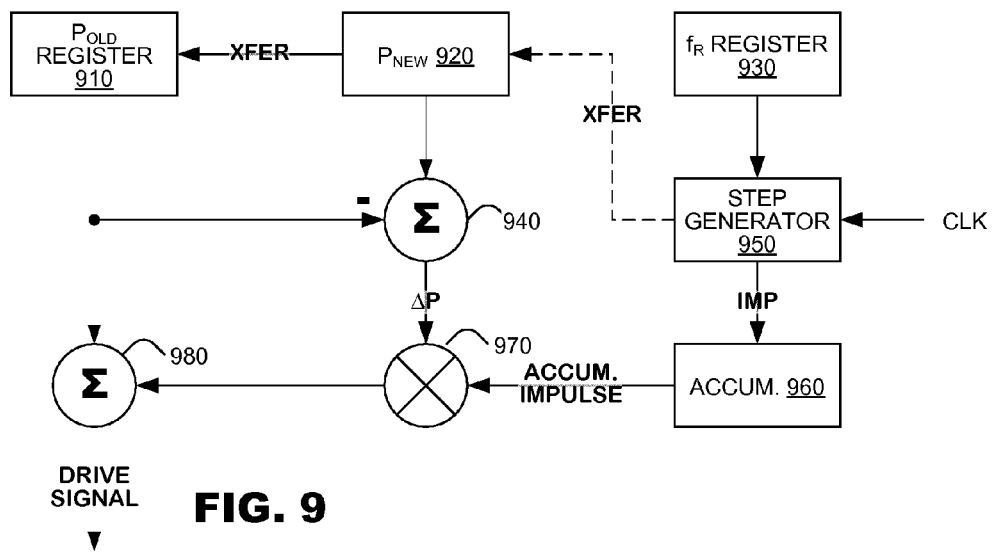
FIG. 9 is a block diagram of a system according to an embodiment of the present invention.

FIG. 9 is a block diagram of a system 900 according to an embodiment of the present invention. As shown, the system may include registers 910-930 for storage of data representing the old and new positions and the expected resonant frequency of the mechanical system. The system 900 may include a subtractor 940 to calculate ΔP from $P_{NEW}$ and $P_{OLD}$. The system 900 further may include an step generator 950 that receives a system clock and generates pulses to an accumulator 960 according to timing determined from Eq. 1. The step generator 950 may generate pulses, for example, as shown in FIG. 6, having amplitudes each corresponding to one half the total distance to be traversed by the mechanical system. The accumulator 960 may sum the aggregate value of pulses generated by the step generator 950 and output the aggregate value to a multiplier 970 that also receives the ΔP value from the subtractor. Thus, the multiplier 970 generates a signal corresponding to the multi-step increments show in FIG. 5. The output of the multiplier 970 may be input to an adder 980 that also receives the $P_{OLD}$ value from register 910. Thus, the adder 980 may generate a time varying output signal sufficient to drive a mechanical system from a first position to a second position with minimal settling time.

When the mechanical system completes its translation from the old position to the new position, the old position may be updated. In the system illustrated in FIG. 9, after the step generator 950 generates its final step to the accumulator, it also may generate a transfer signal to registers 910 and 920 to cause the old position register 910 to be updated with data from the new position register 920.

The drive signal of FIG. 5 works well if the resonant frequency $f_R$ of the mechanical system matches the 'notch' of the drive signal precisely (e.g. within ±3%). Unfortunately, system manufacturers often do not know the resonant frequency of their mechanical systems precisely. Moreover, particularly in consumer devices where system components must be made inexpensively, the resonant frequency can vary across different manufacturing lots of a common product. Thus, although a motor driver might be designed to provide a notch at an expected resonant frequency $f_{RE}$, there can be a substantial difference between the expected resonant frequency and the actual resonant frequency of the mechanical system ($f_{RM}$).

Figure 10:
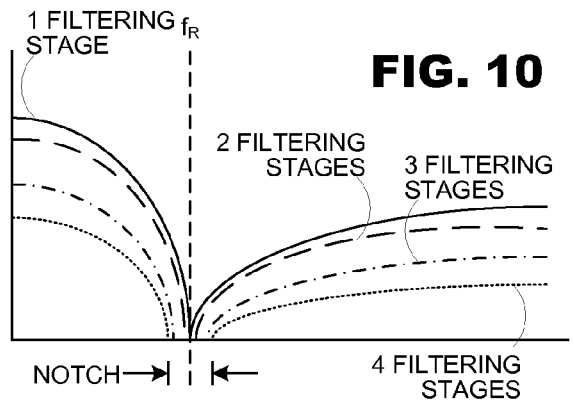
FIG. 10 is a graph illustrating energy distribution by frequency of another drive signal of the present invention.

To accommodate such uses, the principles of the present invention may be expanded to expand the frequency notch to allow greater tolerance in the resonant frequencies used with such systems. One such expansion includes providing multiple layers of filtering to 'widen' the notch. FIG. 10 is a graph showing the expected effects of multiple layers of filtering. Four such layers of filtering are illustrated. Each such additional layer of filtering expands a "notch" of frequencies for which there is zero energy imparted to the system. Although each layer of filtering diminishes the aggregate amount of energy imparted to the system and, therefore, may cause slower movement by the mechanical system, such filtering may be advantageous to overall system operation by reducing settling times for mechanical systems when the resonant frequency of such systems cannot be predicted with precision.

Figure 11:
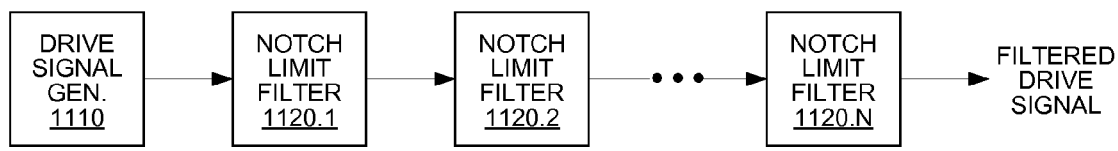
FIG. 11 is a block diagram of a system according to an embodiment of the present invention.

FIG. 11 illustrates a simplified block diagram of a system 1100 according to another embodiment of the present invention. The system includes a drive signal generator 1110 and one or more notch limit filters 1120.1-1120.N provided in series. A first filter 1120.1 in the system 1100 may accept a drive signal from the drive signal generator 1110. Each of the N filters (N≧1) may filter its input signal at an expected resonant frequency ($f_{RE}$). Because the filters are provided in cascade, the multiple filters may operate collectively to provide a filtered drive signal having a notch that is wider than would occur from a single filter system.

Figure 1:
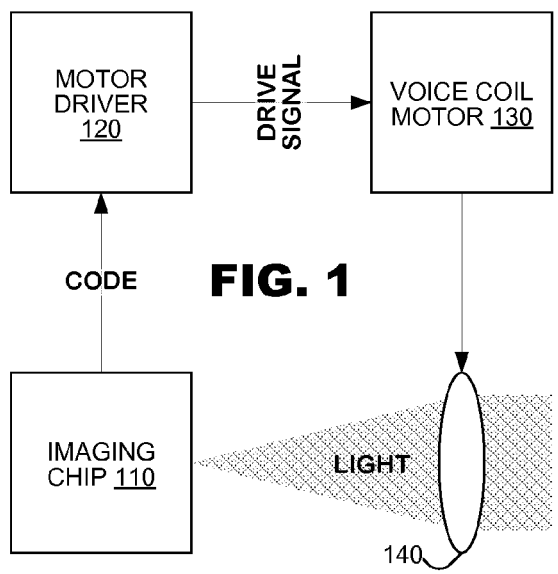
FIG. 1 is a block diagram of an exemplary mechanical system suitable for use with the present invention.
Figure 2:
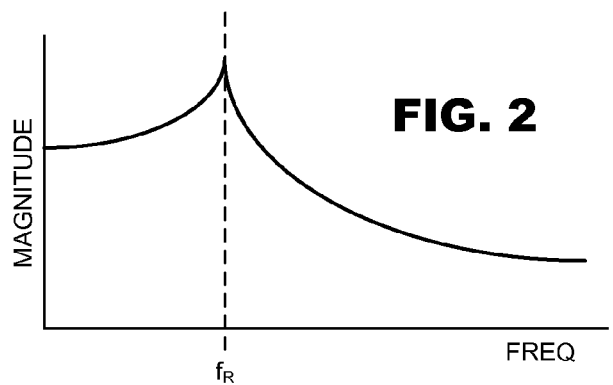
FIG. 2 is a graph of frequency response of an exemplary mechanical system and oscillation that may occur during activation.
Figure 3:
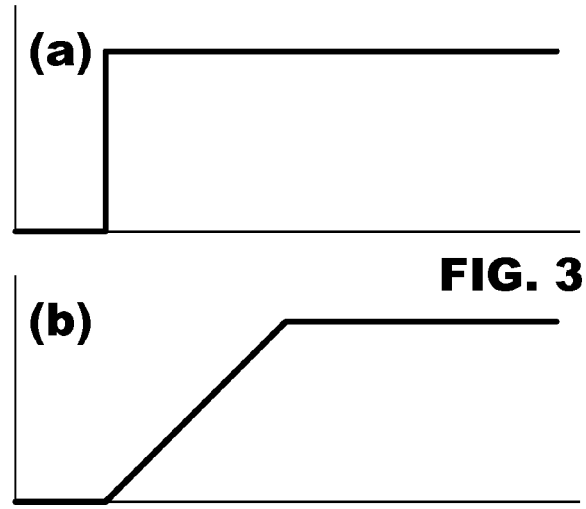
FIG. 3 illustrates conventional drive signals for mechanical systems.
Figure 4:
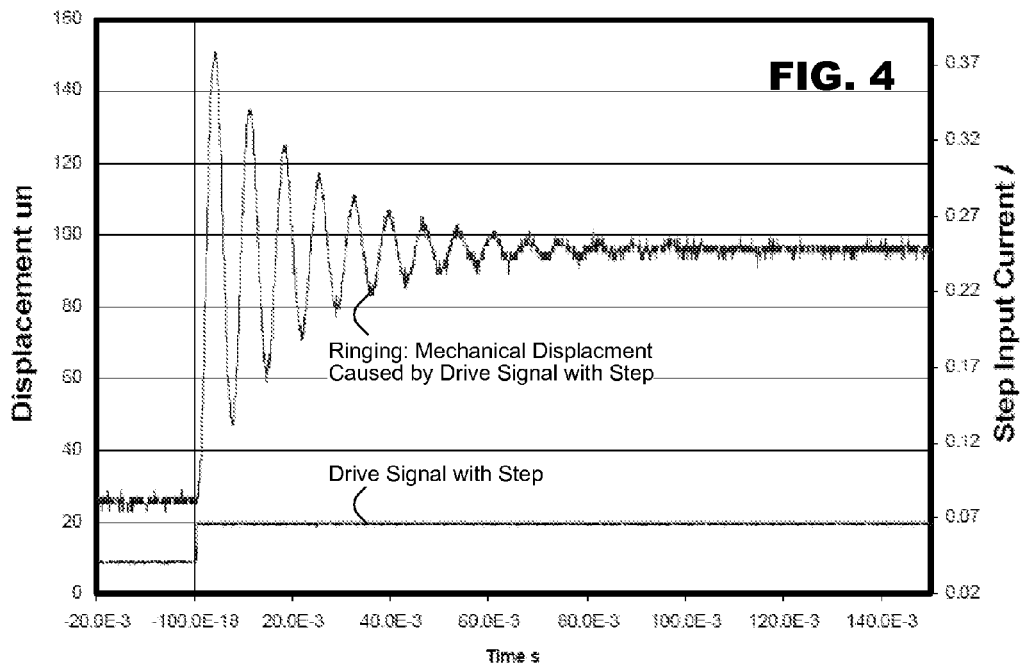
FIG. 4 illustrates response of a mechanical system observed under a unitary step drive signal.

The principles of the present invention find application in a variety of electrically-controlled mechanical systems. As discussed above, they may be used to control lens assemblies in auto-focus applications for cameras and video recorders such as shown in FIG. 1. It is expected that systems using the drive signals discussed herein will achieve improved performance because the lens assemblies will settle at new locations faster than may occur in systems with conventional drive signals. Accordingly, cameras and video recorders will generate focused image data faster than previously achieved.

Figure 12:
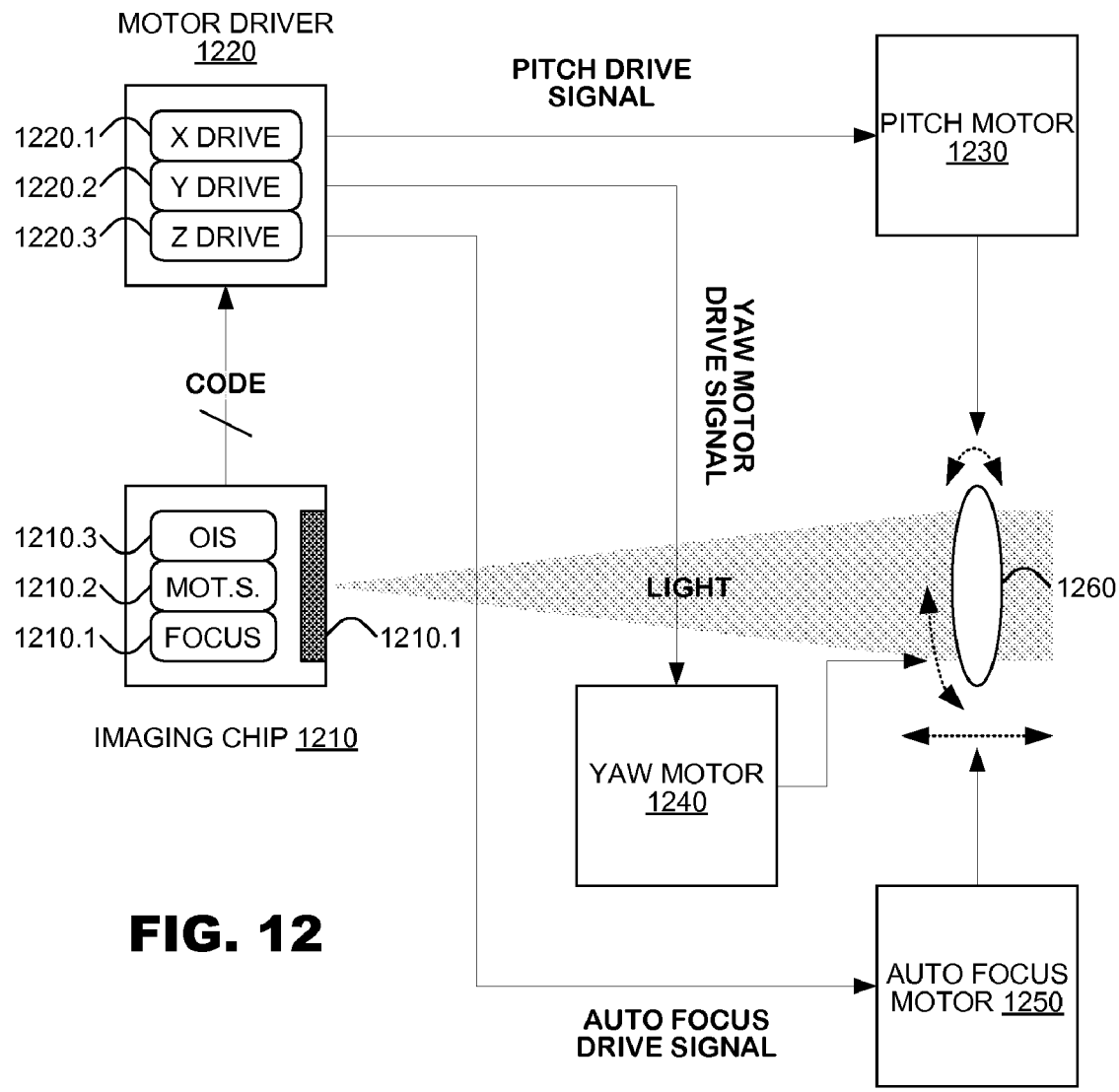
FIG. 12 is a block diagram of another mechanical system suitable for use with the present invention.

FIG. 12 illustrates another system 1200 according to an embodiment of the present invention. The system 1200 of FIG. 12 illustrates a lens control system with multiple dimensions of movement. This system, as with FIG. 1, may include an imaging chip 1210, a motor driver 1220, various motors 1230-1250 and a lens 1260. Each motor 1230-1250 may drive the lens in a multi-dimensional space. For example, as shown in FIG. 12, an auto focus motor 1230 may move the lens laterally with respect to the imaging chip 1210, which causes light to be focused in a light-sensitive surface 1210.1 of the chip 1210. A pitch motor 1240 may rotate the lens through a first rotational axis to control orientation of the lens 1260 in a first spatial dimension. A yaw motor 1250 may rotate the lens through a second rotational axis, perpendicular to the first rotational axis, to control orientation of the lens 1260 in another spatial dimension.

In the embodiment of FIG. 12, the imaging chip 1210 may include processing units to perform auto-focus control 1210.1, motion detections 1210.2 and optical image stabilization (OIS) 1210.3. These units may generate codewords for each of the drive motors 1230-1250, which may be output to the motor driver 1220 on an output line. In the embodiment shown in FIG. 12, the codewords may be output to the motor driver 1220 in a multiplexed fashion. The motor driver 1220 may include motor drive units 1220.1-1220.3 to generate analog drive signals for each of the drive motors 1230-1250. The analog drive signals may be generated according to the foregoing embodiments discussed in connection with FIGS. 5-11. As with the case of a one dimensional lens driver, it is expected that a multi-dimensional lens driver that is driven as shown in the foregoing embodiments will achieve faster settling times than lens drivers driven according to conventional drive signals.

Several embodiments of the present invention are specifically illustrated and described herein. However, it will be appreciated that modifications and variations of the present invention are covered by the above teachings and within the purview of the appended claims without departing from the spirit and intended scope of the invention. For example, although the foregoing embodiment have presented a motor driver system that responds to codewords to address one of several independently addressable positions, it is possible to employ the principles of the present invention in systems in which there are fewer addressable positions. For example, mechanical systems that toggle between one of two different predetermined positions can avoid the need for codewords. In such a case, drive signals may be generated simply from binary activation signals. Additionally, it will be appreciated that the signal illustrated in FIG. 5 represents an idealized form of a drive signal with instantaneous response; in practice, some amount of slew can be expected from a motor driver in actual operating conditions. Such effects have been omitted from the foregoing discussion so as not to obscure the principles of the present invention.

We claim:

1. A method of driving a motor-driven mechanical system, comprising:
   responsive to a codeword identifying a destination position of the mechanical system, generating a stepped drive signal having an amplitude sufficient to move the mechanical system from a start position to the destination position,
   applying a first drive signal step to a motor of the mechanical system,
   applying a second drive signal step to the motor at a time $t_C$ offset from the first step by:

$$t_c \cong \frac{1}{2f_R}$$

where $f_R$ is an expected resonant frequency of the mechanical system.

2. The method of claim 1, wherein the stepped drive signal has substantially zero energy at the expected resonant frequency.

3. The method of claim 1, wherein the second step parks the mechanical system at the destination position with substantially no oscillation.

4. The method of claim 1, wherein the codeword is generated by an image signal processor and the drive signal is applied to a lens drive motor.

5. The method of claim 1, wherein the mechanical system is a lens system having a multi-dimensional range of motion, an image signal processor generates codewords corresponding to each dimension and the method generates multiple drive signals, one corresponding to each of the codewords.

6. The method of claim 5, wherein there are three dimensions and three codewords, one for lateral movement of the lens system, one for pitch of the lens system and one for yaw of the lens system.

7. A method of driving a motor-driven mechanical system, comprising:
   responsive to a codeword identifying a destination position of the mechanical system, determining a drive signal amplitude corresponding to a difference in position (AP) from a start position to the destination position,
   applying a first drive signal step to a motor of the mechanical system at half the drive signal amplitude,
   applying a second drive signal step to the motor at half the drive signal amplitude, the second step being applied at a time $t_C$ offset from the first step by:

$$t_c \cong \frac{1}{2f_R}$$

where $f_R$ is an expected resonant frequency of the mechanical system.

8. The method of claim 7, wherein the stepped drive signal has substantially zero energy at the expected resonant frequency.

9. The method of claim 7, wherein the second step parks the mechanical system at the destination position with substantially no oscillation.

10. The method of claim 7, wherein the codeword is generated by an image signal processor and the drive signal is applied to a lens drive motor.

11. The method of claim 7, wherein the mechanical system is a lens system having a multi-dimensional range of motion, an image signal processor generates codewords corresponding to each dimension and the method generates multiple drive signals, one corresponding to each of the codewords.

12. The method of claim 11, wherein there are three dimensions and three codewords, one for lateral movement of the lens system, one for pitch of the lens system and one for yaw of the lens system.

13. A method of driving a motor-driven mechanical system, comprising:
   responsive to an activation signal, generating a stepped drive signal having an amplitude sufficient to move the mechanical system from a start position to the destination position,
   applying a first step of the drive signal to a motor of the mechanical system,
   applying a second drive signal step to the motor at a time $t_C$ offset from the first step by:

$$t_c \cong \frac{1}{2f_R}$$

where $f_R$ is an expected resonant frequency of the mechanical system.

14. The method of claim 13, wherein the mechanical system remains in a default position in the absence of the activation signal and moves to the destination position when the activation signal is engaged.

* * * * *

UNITED STATES PATENT AND TRADEMARK OFFICE
CERTIFICATE OF CORRECTION

PATENT NO. : 8,299,744 B2
APPLICATION NO. : 12/367883
DATED : October 30, 2012
INVENTOR(S) : Colin Lyden et al.

Page 1 of 1

It is certified that error appears in the above-identified patent and that said Letters Patent is hereby corrected as shown below:

In the Claims

In column 6, line 9, Claim 7 change "in a position (AP)" to -- in a position ($\Delta P$) --

Signed and Sealed this
Sixth Day of August, 2013

Teresa Stanek Rea
*Acting Director of the United States Patent and Trademark Office*